Patented May 5, 1942

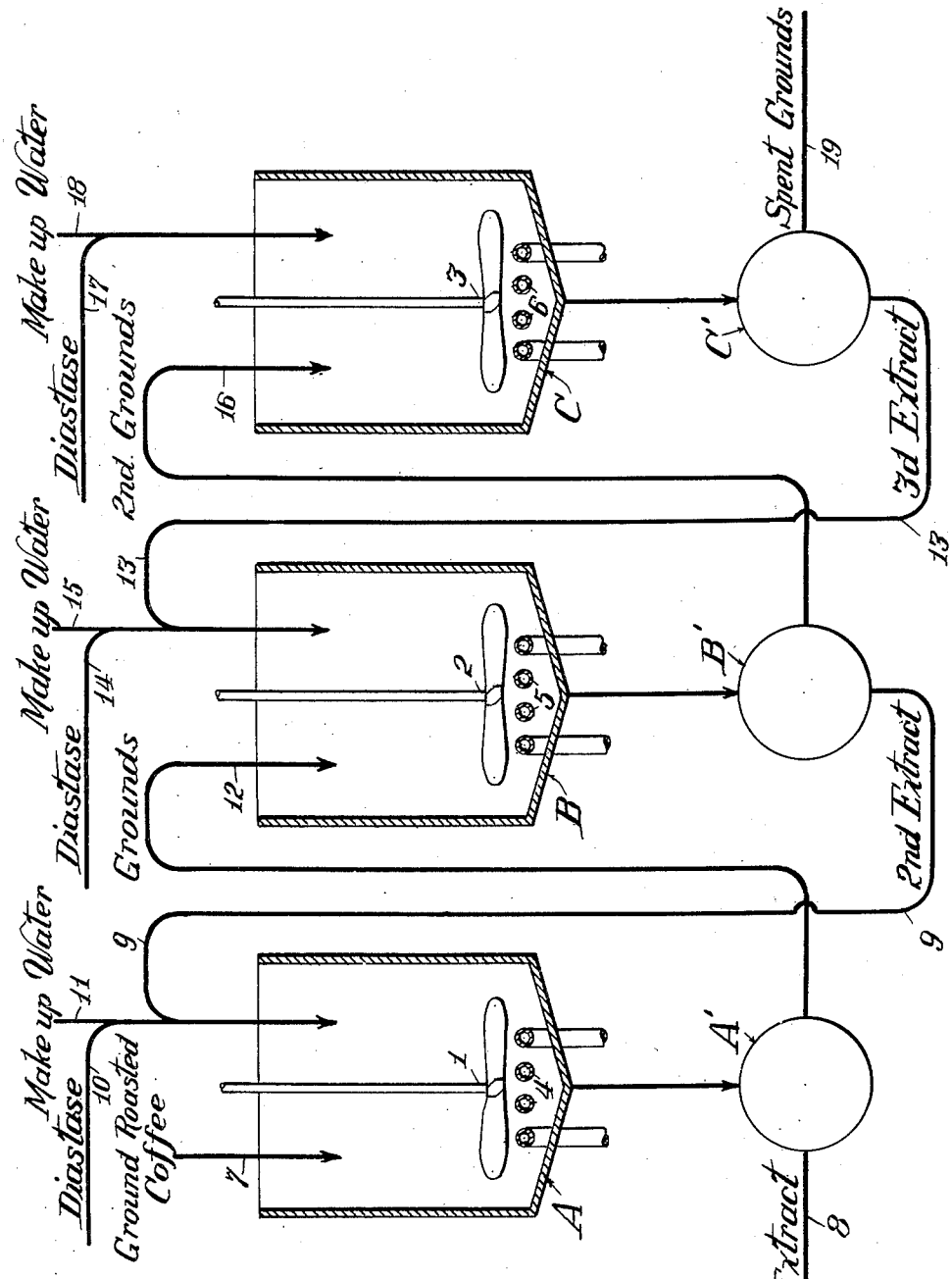

2,282,139

UNITED STATES PATENT OFFICE 2,282,139

PROCESS FOR PRODUCTION OF COFFEE EXTRACT

John L. Kellogg, Chicago, Ill., assignor to Helen L. Kellogg, Chicago, Ill.

Application September 29, 1941, Serial No. 412,898

10 Claims. (Cl. 99—71)

This invention relates to the production of coffee extracts, or instant coffee, as these extracts are sometimes called, which can be made into beverages by the addition of water, hot water for example; and the primary objects of the invention are to improve the flavor and aroma of the coffee extracts, and the beverages made therefrom, and to increase the yield of extracted substances so as to reduce the cost of producing the extract.

The results are accomplished by subjecting ground, roasted coffee in a wet state, preferably during the extracting operation or operations to the action of a converting enzyme, for example, to the action of a diastase, such as taka-diastase, or other enzyme, for example, malt diastase, having a converting or solubilizing effect on the carbohydrate or on the related constituents of the coffee. The action of the enzyme increases the amount of substance extractable from the coffee and makes possible the incorporation or preservation in the extracted substance of certain aromatic and flavoring ingredients which are not present, to the same extent at least, in instant coffees heretofore produced.

The effect is probably due to the conversion of carbohydrate or allied substance into sugars capable of retaining such aroma and flavoring ingredients. However, the invention is not based on the correctness of this theory.

Preferably the extraction in the presence of the diastase is accomplished by agitation of the material and is carried out at elevated temperatures and at hydrogen ion concentrations favorable to the action of the particular enzyme. In the case of taka-diastase, the temperature is preferably between 120° and 130° F., and the pH between 5.0 and 5.5.

The process of extraction is preferably, but not necessarily, conducted on the counter-current principle; and a form of apparatus suitable for carrying out the process is illustrated in the accompanying drawing which is a flow sheet diagram. The invention is not to be considered as limited to this or other form of apparatus or to any particular series of process steps; the intention being to cover all equivalents and all modifications within the scope of the appended claims.

Referring to the drawing, A, B and C indicate three extracting vessels which are provided with agitators 1, 2 and 3, and heating coils 4, 5 and 6, or other means of heating the contents of the vessels by hot water or steam, or otherwise. The coffee material and extract are discharged from the vessels A, B and C into centrifugal machines A', B' and C', respectively. Any other means of separating the extract from the insoluble material may be employed in place of the centrifugal machines. The fresh ground, roasted coffee is introduced into vessel A as indicated at 7, and the finished extract is discharged from centrifugal A' at 8. The first extracting vessel A receives extract from centrifugal B' of vessel B through pipe 9, diastase being introduced at 10 and make-up water at 11. The grounds from centrifugal A' of vessel A are introduced into vessel B at 12, which receives extract from vessel C and centrifugal C' through pipe 13, diastase being introduced into vessel B at 14 and make-up water at 15. The grounds from centrifugal B' of vessel B are introduced into vessel C at 16, vessel C receiving diastase at 17 and water through pipe 18. The spent grounds are discharged from centrifugal C' at 19.

If the diastase, as is preferred, is taka-diastase extract containing 20 grains of enzymes to one fluid ounce, the proportions by weight for vessel A are preferably as follows: ground coffee 200 parts, taka-diastase extract 40 parts, and extract from vessel B plus make-up water 600 parts. The proportion of liquid and solids in vessels B and C may be the same as in vessel A and, preferably, additional diastase may be added either to vessel B or vessel C or to both of them.

The material in vessels A, B and C is kept at a temperature, preferably, between 120° and 130° F. for about one hour, whereupon the material is discharged to the centrifuges and the extract separated from the grounds.

The extract discharged at 8 is concentrated and preferably dried to a powder by any suitable means, or it may be sold in liquid form at any degree of concentration. The extract may be boiled down to 8°–12° Baumé in a vacuum pan, then dehydrated to dryness in a vacuum drier; or the extract may be concentrated to about 28° Baumé and spray dried. The drying should be carried out at as low temperatures as feasible in order not to destroy aromatic and flavoring substances or drive them off by volatilization.

If barley malt is used instead of taka-diastase, the extracting temperature should be between 140° and 148° F.

By employing the procedures above described, or suggested equivalent procedures, it is possible to increase the yield of extractives from a given quantity of coffee, an important consideration in view of the relatively high cost of the material, and also to improve the flavor and aroma of the beverage made from the extract.

This process can be applied to the treatment of decaffeinized coffee and so-called cereal coffees or coffee substitutes made from roasted vegetable materials.

This application is a continuation in part of co-pending application of John L. Kellogg, Serial No. 338,876, filed June 5, 1940.

I claim:

1. Improvement in the process of making coffee extract which comprises: treating roasted coffee material in water with a converting enzyme.

2. Improvement in the process of making coffee extract which comprises: treating roasted coffee material in water with diastase.

3. Improvement in the process of making coffee extract which comprises: treating roasted coffee material in water with taka-diastase.

4. Improvement in the process of making coffee extract which comprises: treating roasted coffee material in water with taka-diastase at a temperature between 120° and 130° F.

5. Improvement in the process of making coffee extract which comprises: treating roasted coffee material in water with taka-diastase at a temperature between 120° and 130° F. and with agitation.

6. Process of making coffee extract which comprises: extracting roasted coffee substance with water in the presence of taka-diastase at a temperature between 120° and 130° F. and at a pH between 5.0 and 5.5.

7. Process of making coffee extract which comprises: extracting roasted coffee substance with water in the presence of a converting enzyme and with continued agitation of the material.

8. Process of making coffee extract which comprises: extracting roasted coffee substance with water in the presence of taka-diastase and with continued agitation of the material.

9. Improvement in the process of making a beverage extract from roasted vegetable matter which comprises: treating the roasted vegetable material in water with a converting enzyme.

10. Improvement in the process of making a beverage extract from roasted vegetable matter which comprises: treating the roasted vegetable material in water with taka-diastase.

JOHN L. KELLOGG.